US005276954A

United States Patent [19]

Gerrans et al.

[11] Patent Number: 5,276,954

[45] Date of Patent: Jan. 11, 1994

[54] SLIDE MOUNTER

[75] Inventors: Wilbur Gerrans, Marysville, Wash.; James A. Truc, Eden Prairie; Edwin D. Jansen, Annandale, both of Minn.

[73] Assignee: Pakon, Inc., Minnetonka, Minn.

[21] Appl. No.: 897,375

[22] Filed: Jun. 11, 1992

[51] Int. Cl.[5] .......................... B23Q 7/00; B65B 63/00

[52] U.S. Cl. .................................. 29/564.6; 29/33 K; 53/520

[58] Field of Search ........... 29/33, 29. K, 411, 564.2, 564.6, 56.5, 564.7, 53/520, 284.2, 457, 435 53/520, 284.2, 53/457, 435

[56] References Cited

U.S. PATENT DOCUMENTS

| | | | |
|---|---|---|---|
| 3,521,423 | 7/1970 | Koeppe et al. | 53/435 |
| 4,004,340 | 1/1977 | Urban | 29/411 X |
| 4,227,289 | 10/1980 | Avalon et al. | 29/33 K |
| 4,237,678 | 12/1980 | Thompson | 29/564.6 X |
| 4,543,771 | 10/1985 | Jensen | 53/520 |
| 4,665,681 | 5/1987 | Facchini et al. | 53/520 |
| 4,934,128 | 6/1990 | Savio et al. | 53/520 |

FOREIGN PATENT DOCUMENTS

| | | | |
|---|---|---|---|
| 680417 | 2/1964 | Canada | 53/520 |
| 1921338 | 11/1969 | Fed. Rep. of Germany | 53/457 |
| 1918970 | 10/1970 | Fed. Rep. of Germany | 53/520 |

*Primary Examiner*—William Briggs
*Attorney, Agent, or Firm*—Kinney & Lange

[57] ABSTRACT

A slide mounter where a photographic film transparency is advanced to an operation station and is cut from a photographic film web and punch holes are punched. The cut and punched film transparency is then inserted into a slide mount at an insertion station. The punch holes are designed to cooperate with pin registrations in the slide mount to lock the film transparency in place within the slide mount. The photographic film transparency is cut from a photographic web which is supported along a support axis. The film transparency is pushed from the operation station after it is cut and punched along a push axis into the slide mount M. The orientation of the push axis and the support axis is design to accommodate exposed film where the image is 90° from the normal orientation of images recorded by a photographic camera.

17 Claims, 10 Drawing Sheets

SLIDE MOUNTER

BACKGROUND OF THE INVENTION

The present invention relates to an apparatus for mounting a photographic film transparency from a photograph film web to prepare a photographic slide.

Photographic film transparencies are generally severed from a photographic film web and inserted into a photographic slide mount for use with a slide projector or other visualizing means. In particular, automatic and semi-automatic slide mounters have been developed to continuously mount a plurality of film transparencies into empty slide mounts supplied from a slide magazine.

A photographic film web is generally supported along a film track of the slide mounting apparatus. The film web is advanced along the film track to the knife assembly where individual film transparencies are severed from the photographic film web. The severed film transparencies are then inserted into slide mounts ejected from the slide magazine by a slide ejector.

In the preparation of photographic slides, it is important to ensure that the exposed image of the individual film transparencies is squarely positioned within the slide mount so that the exposed image is visible during use of the photographic slide. Typical slide mounts are formed of upper and lower frame sections which are connected along an outer border to form a pocket therebetween. Each of the frame sections includes a window which cooperatively define an aperture of the slide mount. It is within this aperture that the exposed images of photographic film transparencies must be aligned for viewing.

A variety of different slide mounts have been developed which help secure the photographic film transparency within the pocket of the slide mount. In one such example of a slide mount, registration pins are formed on the lower frame section. The registration pins engage the film to lock the film within the slide mount to ensure that the exposed image of the photographic film is correctly aligned and remains positioned within the aperture of the slide mount. The registration pins are designed to grip the film through engaging holes. Ordinarily photographic film includes sprocket holes along the lateral edges of the film to advance individual film transparencies for exposure. The sprocket holes define engaging holes for the registration pins to secure a film transparency within a slide mount. If sprocket holes are not included along the film, the registration pins can not lock the film.

Photographic film may also be exposed electronically from a cathode-ray tube "CRT" screen display. The image from the "CRT" screen is processed through an image generator to expose a piece of film. Because CRT exposed film is not fed through a photographic camera, it does not necessarily include sprocket holes. In addition, the orientation of the images on CRT exposed film may be 90° from the normal orientation of images recorded by a photographic camera.

SUMMARY OF THE INVENTION

The present invention relates to a slide mounter for inserting a photographic film transparency from a photographic film web into a slide mount. Individual film transparencies are severed from the photographic film web and punch holes are punched prior to insertion of the photographic film transparency into the slide mount. The punch holes are aligned to correspond with registration pins formed in the slide mount. The registration pins extend through the punch holes when the film transparency is inserted into the slide mount to lock the film transparency in the slide mount for use of the photographic slide.

In the apparatus as shown, the photographic film web is supported and advanced along a support axis where the film transparency is cut and punched. The slide mounts are stored for operation in a slide magazine and are advanced from the slide magazine along an ejection axis to align the slide mount with the cut and punched film transparency. The cut and punched film transparency is pushed along a push axis to advance the film transparency into the slide mount. The support axis is (along which the film web is advanced) perpendicular to the push axis (along which the cut and punched film transparency is pushed into the slide mount). This orientation of operation is designed for photographic film where the photographic image is oriented at 90° to the orientation of a normal image recorded by a photographic camera. Since the support axis is oriented 90° from the push axis, when the film transparency is pushed into the slide mount, the 90° shift of the image will be accommodated for and the image of the film transparency will be correctly positioned within the slide mount.

BRIEF DESCRIPTION OF THE DRAWINGS

FIG. is a simplified view illustrating operation of the slide mounter of the present invention.

DETAILED DESCRIPTION OF THE PREFERRED EMBODIMENT

Figure 1:
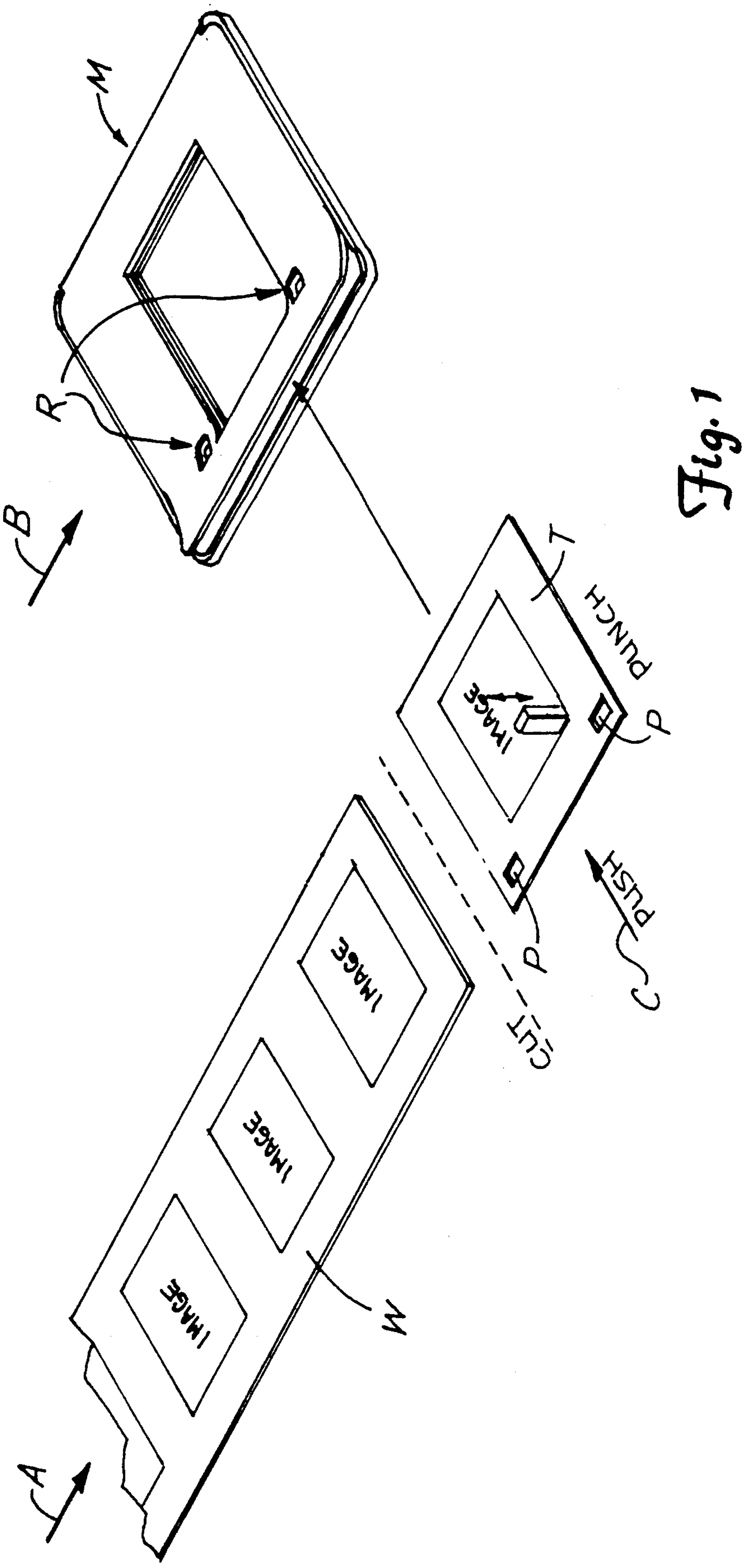

FIG. 1 illustrates in simplified form the operation of a slide mounter according to the present invention. As shown, during operation, transparency T is severed from a photographic film web W and inserted into a slide mount M. Before the severed film transparency T is inserted into slide mount M, punch holes P are formed in the transparency T. The punch holes P are formed to correspond with registration pins R on the slide mount to secure the film transparency T within the slide mount M.

The photographic film web W is advanced along a support axis A where the slide mount is cut and punched. The slide mount M is advanced along an ejection axis B to align with the cut and punched film transparency T. After film transparency T is cut and punched, the film transparency T is pushed along a push axis C into slide mount M. The support axis A along which the film web W is advanced is parallel to the ejection axis B along which slide mounts M are advanced. The support axis A (along which the film web W is advanced) is perpendicular to the push axis C (along which the cut and punched film transparency is pushed into the slide mount M). This orientation of operation is specifically designed to accommodate film where the photographic image is oriented at 90 degrees to the orientation of a normal image recorded by a photographic camera. Such film may have been processed electronically from a cathode-ray tube "CRT" screen display where the image from the "CRT" screen is processed through an image generator to expose the film. Although the apparatus shown in the application is designed to accommodate film where the images are oriented at 90 degrees out of phase from a normal film web recorded by a photographic camera, it should be understood that the features of the apparatus also may be used for preparing photographic slides for a normal film web recorded by a photographic camera.

(1) OVERVIEW OF APPARATUS (FIGS. 1-3)

Figure 2:
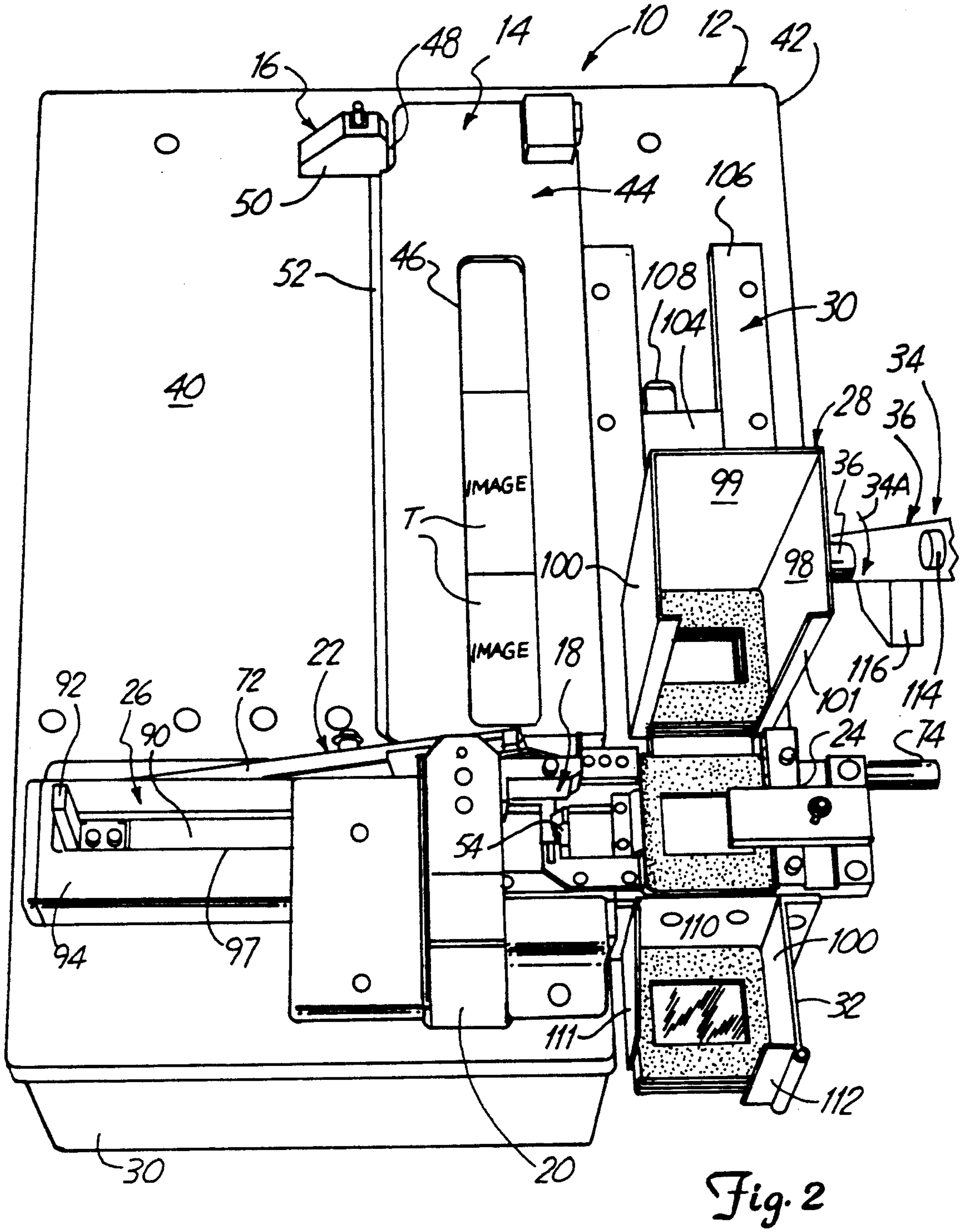
FIG. 2 is a perspective view, generally from above, of the slide mounting apparatus of the present invention.
Figure 3:
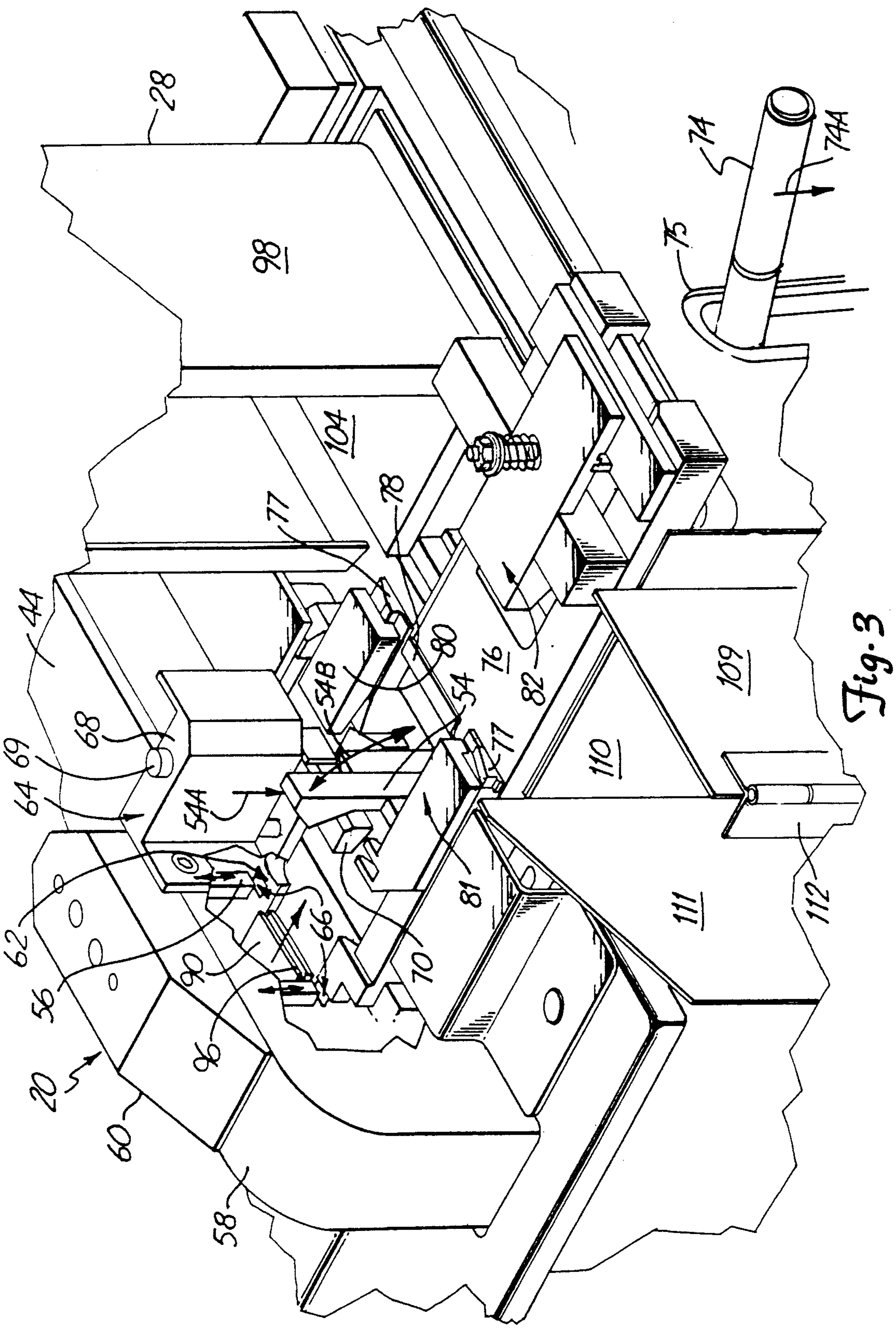
FIG. 3 is a perspective view of a right front portion of the slide mounting apparatus with portions broken away for clarity.

FIGS. 2 and 3 show a slide mounter 10 which is used to mount individual film transparencies T from web W into slide mount M in the manner described with reference to FIG. 1. FIG. 2 is an overall view of the slide mounter 10 while FIG. 3 is a more detailed view of the right front corner of the slide mounter 10. In addition, some of the parts are broken away in FIG. 3 for ease of illustration and discussion.

Slide mounter 10 includes housing 12, film track 14, film infeed assembly 16, operation station 18, punch mechanism 20, knife assembly 22, insertion station 24, film pusher 26, slide magazine 28, slide ejector mechanism 30, catch magazine 32, operating lever 34 and drive rod 36. Housing 12 includes side walls 38 and a top plate 40. The housing 12 forms a part of a frame 42 for supporting the operation mechanisms of the slide mounter 10.

Film track 14 is mounted on top plate 40. Film track 14 includes a pivotally supported cover plate 44 which has an aperture 46 and a back recessed surface 48. Cover plate 44 is shown in a closed position in FIG. 2. When the cover plate 44 is pivoted to an open position, a new film web W can be inserted for operation. To pivot the cover plate 44 to the open position, the film infeed assembly 16 must be retracted as shown in FIG. 2 to align the film infeed assembly 16 with the back recessed surface 48 of the cover plate 44 to permit the cover plate 44 to open. Accordingly, movement of the cover plate 44 is restricted while slide mounter 10 is in operation.

Film infeed assembly 16 advances a film web to the operation station 18. Lock 50, which forms a part of the film infeed assembly 16, is shown in FIG. 2. Lock 50 moves along a slot 52 in the top plate 40 of the housing 12 as web W is advanced. Lock 50 prevents the cover plate 44 from being opened until all of the web W has been advanced to the operation station 18 and the lock 50 is aligned with the back recessed surface 48 of the cover plate 44.

Operation station 18 is where the film transparency T is cut from the film web W and punch holes P are formed. As shown more clearly in FIG. 3, the operation station 18 includes a film guide assembly 54. The film guide assembly 54 guides a film transparency T advanced by the film infeed assembly 16 into the operation station 18. During operation, the film guide assembly 54 moves towards the punch mechanism 20 to bias the film transparency T towards the punch mechanism 20 for exacting film placement for operation. After the film transparency T is cut and the punch holes P are punched, the film guide assembly 54 is lowered (arrow 54A) to permit operation of the film pusher 26.

The punch mechanism 20 includes opposed punch pins 56, punch base 58, cap 60, punch/cutting anvil 62 and film clamp 64. Punch mechanism 20 is located at the operation station 18 and punches the pair of punch holes P into the transparency T. The opposed punch pins 56 are supported by the puncher base 58. The cap 60 is mounted to the puncher base 58. The punch/cutting anvil 62 supports the film during operation of the punch mechanism 20. The punch/cutting anvil 62 includes punch holes 66 which are aligned with the punch pins 56 for operation of the punch mechanism 20.

The film clamp 64 includes support 68, bearing connector 69 and clamp 70. The support 68 is mounted to the punch base 58 to support and moves the clamp 70 in cooperation with the punch mechanism 20 between a retracted position and a clamped position to clamp the film transparency T during operation of the punch mechanism 20. The clamp 70 is connected to the support 68 via bearing connector 69 to slidably support the clamp 70 during operation of the punch mechanism 20.

As shown in FIG. 2, the knife assembly 22 is aligned to sever the film transparency T at the operation station 18. The knife assembly 22 includes pivotally supported blade 72 and a pivot rod 74. The pivot rod 74 extends through a rod slot 75 in one of the side walls 38 of the slide mounter 10 to connect to the pivotally supported blade 72. The pivotally supported blade 72 is moved between an opened position and a closed cutting position to cooperate with the punch/cutting anvil 62 to cut the film transparency T. The pivotally supported blade 72 is moved by the pivot rod 74 which is aligned with the operating lever 34.

The insertion station 24 is aligned with the operation station 18. The cut/punched film transparency T is inserted into a slide mount M at the insertion station 24. The insertion station 24 includes base 76, slide separators 77, slide holder 78, film tracks 80 and 80 and film inserter guide 82. The base 76 supports the slide mount M which is advanced past the slide separators 78 and 79 to open an insertion opening into the slide mount M for advancing the cut film transparency T into the slide mount M. The insertion opening into the slide mount is held open by the slide holder 80. The film tracks 80 and 81 supports the film transparency T along the lateral edges as it is advanced from the operation station 18 to the insertion station 24. The film inserter guide 82 directs the inserted film transparency T into the pocket of the slide mount M at the insertion station 24.

The film pusher 26 is aligned with the cut and punched film transparency T to advance the cut and punched film transparency T from the operation station 18 into the slide mount M at the insertion station 24. The film pusher 26 includes pusher 90, pusher handle 92, pusher cap 94 and front groove surface 96 (as shown in FIG. 3). The pusher 90 is movable supported from a retracted position shown in FIG. 2 to an insertion position, at the insertion station 24, along a pusher track (not visible). As the pusher 90 is advanced to the insertion position, the front grooved surface 96 engages the cut film transparency T to insert the film transparency T into a slide mount M. Operation of the pusher 90 is manually controlled via the pusher handle 92. Cap 94 covers the pusher 90 and includes a slot 97. The pusher handle 92 extends through slot 97 of cap 94 and is movable within the slot 97 to advance pusher 90 along the pusher track for operation.

The slide magazine 28 holds a plurality of slide mounts M for operation. The slide magazine 28 includes support faces 98, 99, 100 and 101 and slide ejector opening 102. The support faces 98–101 are connected perpendicularly to enclose a slide mount M inserted therein. Slide mounts M are ejected through the ejector opening 102 to the insertion station 24 to prepare a photographic slide.

The slide ejector mechanism 30 ejects a slide mount M through the ejector opening 102 to the insertion station 24. The slide ejector mechanism 30 includes ejector 104, ejector track 106 and ejector frame slot 108. The ejector 104 is movable along the ejector track 106 to force a slide mount M through the ejector opening 102 of the slide magazine 28. The ejector 104 is operated along the ejector track 106 through the ejector frame slot 108. The ejector 104 operates between a retracted position (not shown) and an insertion position (shown in FIG. 2) to eject a slide mount M to the insertion station 24.

The catch magazine 32 is aligned to receive a prepared photographic slide which is forced from the insertion station 24 via ejection of a slide mount M during operation of the slide ejector mechanism 30. The catch magazine 32 includes support faces 109, 110, 111 and 112. The support faces 109–112 are perpendicularly connected to enclose a prepared photographic slide.

The operating lever 34 is rotatably supported relative to the housing 12 for operation of the mechanisms of the slide mounter 10. The operating lever 34 includes a handle 114 and a knife actuator block 116. The handle 114 is partially shown in FIG. 2 and extends from the operation lever 34 so that the user may rotate the operating lever 34. The knife actuator block 116 is align with the pivot rod 74 of the knife assembly 22 to contact the pivot rod 74 for operation of the knife assembly 22. The drive rod 36 is coupled with the operating lever 34 and the operating mechanisms of the slide mounter 10. Accordingly, rotation of the operation lever 34 operates the mechanisms of the slide mounter 10 via the drive rod 36.

During operation, the film web W is advanced along the film track 14 by the film infeed assembly 16. The film infeed assembly 16 advances a leading film transparency T to operation station 18 to prepare the leading film transparency T for insertion into a slide mount M. At the operation station 18, the punch mechanism 20 and the knife assembly 22 operate to cut and punch the leading film transparency T for insertion into the slide mount M located at insertion station 24. After the punch mechanism 20 and the knife assembly 22 operate, the film pusher 26 is manually moved to the right to advance the severed film transparency T into slide mount M at the insertion station 24.

Slide mounts M are stored for operation in a slide magazine 28. The slide mounts M are ejected one at a time from the slide magazine 20 by the slide ejector mechanism 30 to the insertion station 24. As each slide mount M is ejected to the insertion station 24 it pushes the previously filled slide mount M into the catch magazine 32.

(2) DETAILED DESCRIPTION OF AN OPERATING CYCLE (FIGS. 2 & 3)

The operating lever 34 rotates (arrow 34A) between a first position, a second position and a third position during an operation cycle of the slide mounter 10. Movement of the operating lever 34 between the first and second positions operates the punch mechanism 20. Movement of the operating lever between the second position and the third position operates the knife assembly 22. While the operating lever 34 is still in the third position (fully rotated) the film pusher 26 is manually operated to insert the cut and punched film transparency T into slide mount M at the insertion station 24. Thereafter, the operating lever 34 is released for the next operation cycle. As the operating lever is released, the slide ejector 30 ejects another empty slide mount M from the slide magazine 28 to the insertion station 24.

Prior to operation of the operating lever 34, a film transparency T is advanced by the film infeed assembly 16 to the operation station 18. When the operating lever 34 is rotated from the first position to the second position, the punch mechanism 20 is moved from a retracted position towards a punch position to punch opposed punch holes P in the leading film transparency T. As the operating lever 34 rotates from the second position to the third position, the punch mechanism 20 is moved from the punch position to the retracted position and the knife assembly 22 moves to the cutting position via contact of the operating lever 34 with the pivot rod 74.

(3) OPERATION OF PUNCH MECHANISM (FIG. 4)

Figure 4:
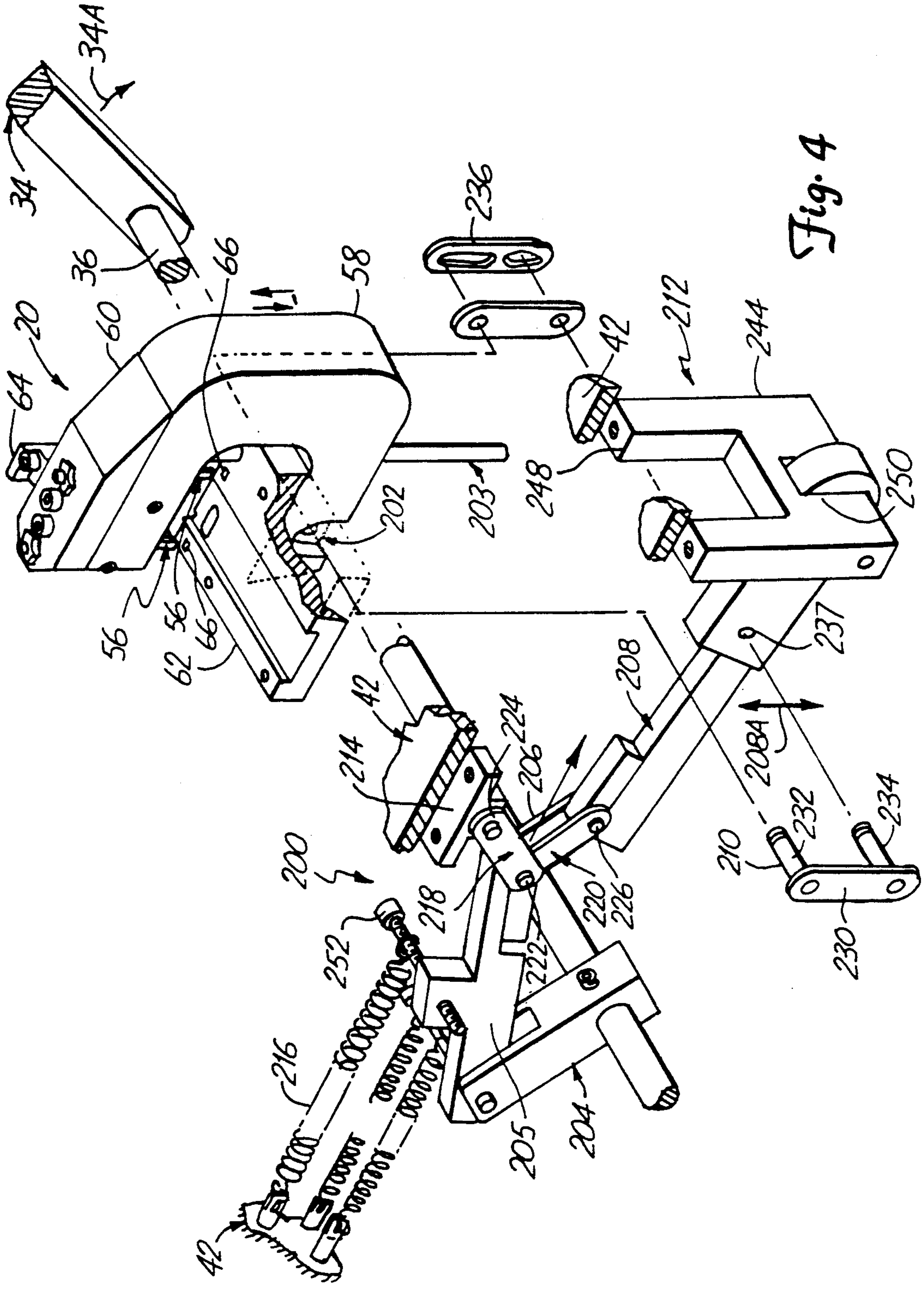
FIG. 4 is an exploded perspective view of the puncher mechanism and puncher linkage operating assembly.

FIG. 4 illustrates operation of the punch mechanism 20. As explained, the punch mechanism 20 operates between the retracted position and the punch position. The punch mechanism 20 is operated in cooperation with the operating lever 34 via the drive rod 36 through a punch linkage operating assembly 200.

As shown in FIG. 4, the punch mechanism 20 includes throughbore 202 and shaft 203. The throughbore 202 extend through the punch base 58. The punch linkage operating assembly 200 is connected to the punch base 58 at throughbore 202. The shaft 203 is supported by the punch/cutting anvil 62. The punch base 58 is slidably mounted to the shaft 203 for vertical alignment of the punch mechanism 20 relative to the frame 42.

The punch linkage operating assembly 200 includes crank arm 204, link chain drive 205, reciprocating link chain 206, punch drive arm 208, punch link 210, punch drive support 212, stationary support 214 and springs 216.

Operation of the reciprocating link chain 206 moves the punch mechanism 20 between the retracted position and the punching position. The reciprocating link chain 206 includes first and second links 218 and 220. The first and second links 218 and 220 are connected at 222. A free end 224 of the first link 218 is connected to the stationary support 214 A free end 226 of the second link 220 is connected to the punch drive arm 208. The link chain drive 205 is attached to the link chain 206 at the connection 222 of the first and second links 218 and 220 to reciprocally move the reciprocating link chain 206 to reciprocally move the punch drive arm 208 (arrow 208A) to operate the punch mechanism 20.

The crank arm 204 is connected to the link chain drive 205 to move the link chain drive 205. The crank arm 204 is coupled with the drive rod 36 so that crank arm 204 rotates in response to the rotation of the operating lever 34 between the first, second and third positions. Accordingly, the crank arm 204 moves the link chain drive 205 which operates the reciprocating link chain 206 to operate the punch mechanism 20 via the punch drive arm 208.

The punch drive support 212 supports the punch drive arm 208 so that the punch drive arm 208 moves relative to the frame 42. The punch drive support 212 includes a base 244, mounting legs 246 and 248 and a connection slot 250. Mounting legs 246 and 248 connect the punch drive support 212 to the frame 42. The punch drive arm 208 is connected to the punch drive support 212 at the connection slot 250. The punch link 210 connects the punch drive arm 208 to the punch mechanism 20. In particular, the puncher link 210 includes a base 230, first and second pins 232 and 234 and back plate 236. The punch drive arm 208 includes bore 237. Pin 232 of the link 210 extends into throughbore 202 in the punch base 58. Pin 234 extends through the bore 237 of the punch drive arm 208. The backplate 236 secures the pins 232 and 234 in place. Accordingly, operation of the punch drive arm 208 moves the punch mechanism 20 between the retracted position and the punching position via the punch link 210.

Springs 216 are connected to a spring connection pin 252 mounted at one end to the link chain drive 205 and is connected to the frame 18 at the other end. Accordingly, the spring 216 moves the link chain drive 205 and the reciprocating link chain 206 to an initial position after operation of an operating cycle of the slide mounter 10.

Operation of the reciprocating link chain 206 by the crank arm 204 moves the punch mechanism 20 between the retracted position and the punching position. In particular, during an operation cycle of the mounter 10, the reciprocating link chain 206 moves from a first position to a second position to a third position. In the first position (shown in FIG. 4), the first and second links 218 and 220 of the reciprocating link chain 206 are arranged at an acute angle relative to one another to form a "V". In this position, the punch drive arm 208 supports the punch mechanism 20 in the retracted position. In the second position, the first and second links 218 and 220 of the reciprocating link chain 206 are aligned so that the first and second links 218 and 220 form a straight line. This arrangement moves the punch drive arm 208 (arrow 208A) to lower the punch mechanism 20 to the punching position. In the third position, the first and second links 218 and 220 move to form an acute angle relative to one another, opposite from the "V" position formed in the first position. In the third position, the punch drive arm 208 again supports the punch mechanism 20 in the retracted position.

The reciprocating link chain 206 operates between the first, second and third positions via operation of the crank arm 204 and link chain drive 205. (via operating lever 34). When the operating lever 34 is in the first position (i.e. prior to operation), the reciprocating link chain 206 is in the first position to maintain the punch mechanism 20 in the retracted position via connection of the link chain 206 to the punch drive arm 208. As the operating lever 34 moves from the first position to the second position, the crank arm 204 and link chain drive 205 move the reciprocating link chain 206 to the second position to lower the punch mechanism 20 to the punching position. As the operating lever 34 moves to the third position, the reciprocating link chain 206 moves to the third position to raise the punch mechanism 20 to the retracted position. After the operating lever 34 is released, springs 216 moves the link chain drive 205 to force the reciprocating link chain 206 back to the first position (i.e. retracted position) for the next operation cycle.

(4) OPERATION OF KNIFE ASSEMBLY (FIG. 5)

Figure 5:
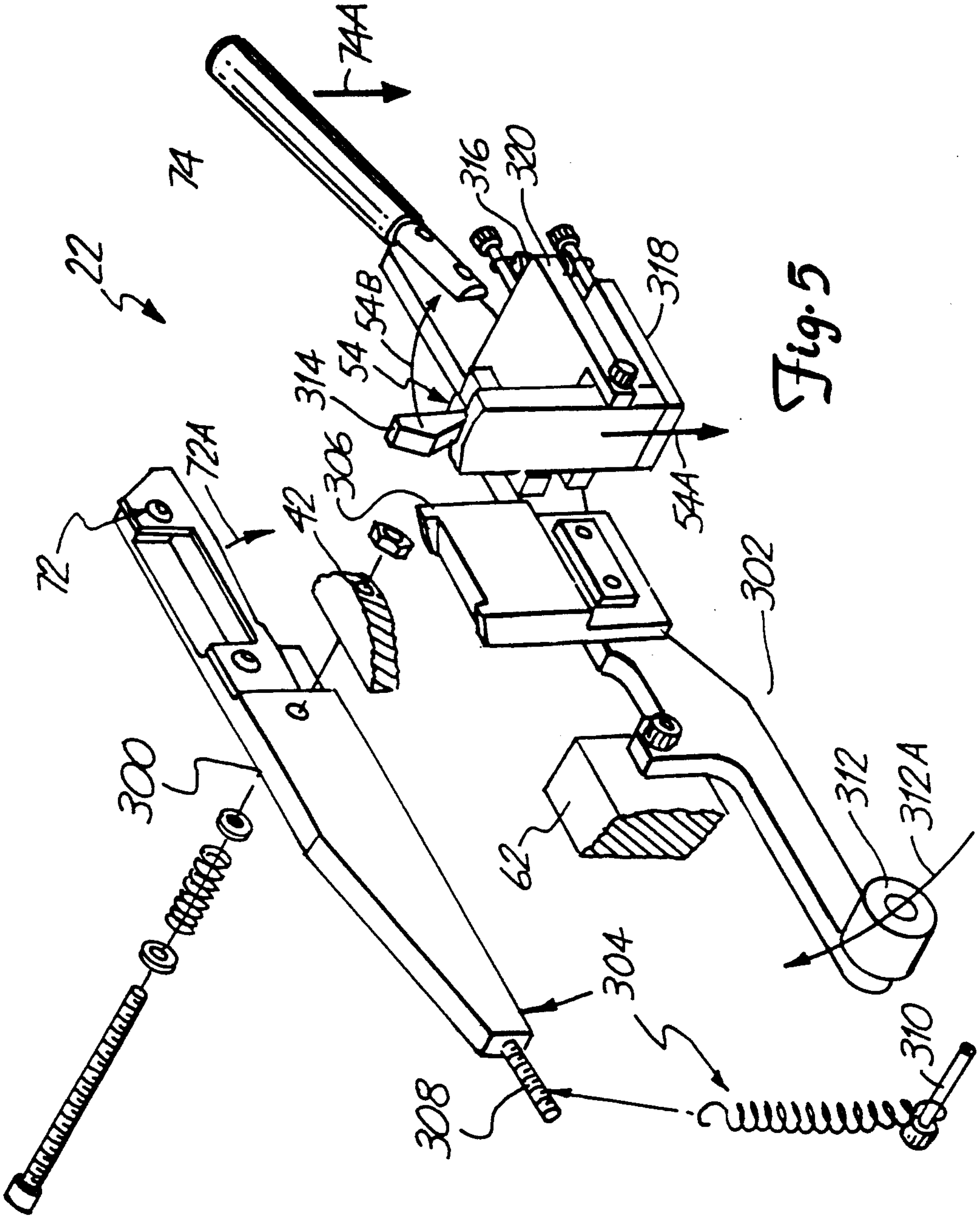
FIG. 5 is an exploded perspective view of the knife assembly.

FIG. 5 illustrates operation of the knife assembly 22. As previously explained, the knife assembly 22 includes pivotally supported blade 72 and a pivot rod 74. As shown in FIG. 5, the knife assembly 22 further includes a pivotally supported knife handle 300, a pivotally supported knife actuator 302, spring 304 and film support 306. The knife blade 72 pivots between the opened position and the closed cutting position for operation of the knife assembly 22.

The knife handle 300 supports the knife blade 72. The spring 304 biases the knife handle 300 to support the knife blade 72 in the opened position. The knife handle 300 includes a spring mounting pin 308. A corresponding mounting pin 310 is supported relative to the frame 42. A first end of the spring 304 is connected to the spring mounting pin 308 of the knife handle 300 and the opposed end of the spring 304 is mounted to the mounting pin 310 to normally bias the knife handle 300 in the opened position.

The knife blade 72 is moved between the opened position and the closed cutting position by the knife actuator 302. As shown, the knife actuator 302 includes a roller contact 312 The knife actuator 302 is pivotally mounted relative to the frame 42 at the punch/cutting anvil 62. The pivot rod 74 is connected at a first end of the knife actuator 302 and extends through the rod slot 75 in one of the side walls 38 of the slide mounter 10. The roller contact 312 is mounted at the other end of the knife actuator 302 and is aligned with the knife handle 300 to contact the knife handle 300 during operation. The knife actuator 302 also supports the film support 306 and the film guide assembly 54.

When the operating lever 34 is moved from the second position to the third position, the operating lever 34 contacts the pivot rod 74 to lower the pivot rod 74 (arrow 74A). When the pivot rod 74 is lowered (arrow 74A), the roller contact 312 rotates upwardly (arrow 312A). The rotated roller contact 312 contacts the knife handle 300 to move the knife handle 300 against the spring bias (spring 304) to lower the knife blade 72 (arrow 72A) toward the punch/cutting anvil 62 to cut the film transparency T . After the operating lever 34 is released, the pivot rod 74 is released, and the knife handle 300 is rotated by the spring bias (spring 304) to return the knife blade 72 to the opened position.

The film guide assembly 54 is supported by the knife assembly 22. The film guide assembly 35 includes film guide 314, fixed support 316, connection plate 318 and spring 320. The fixed support 316 is mounted to the knife actuator 302. The film guide 314 is pivotally supported relative to the fixed support 316. The connection plate 318 is connected to the film guide 314. Spring 320 connects the connection plate 318 to the fixed support 316 to normally bias the film guide 314 toward the punch mechanism 20.

The film guide 314 has a beveled operating face 322. The beveled operating face 322 is aligned with the clamp 70 of the film clamp 64. When the clamp 70 is in the retracted position, the clamp 70 engages the beveled operating face 322 of the film guide to force the film guide 314 to move the film guide 314 against the spring bias (spring 320) to a back position prior to operation. During operation when clamp 70 is lowered to the clamped position, the clamp 70 no longer contacts the beveled operating face 322 of the film guide 314 to move the film guide 314 against the spring bias and therefore, the film guide 314 is moves to the forward position towards the punch mechanism 20. In the forward position, the film guide 314 engages the film for exacting film transparency T placement relative to the punch pins 56 for operation.

The film guide assembly 54 is supported by the knife actuator 302 so that the film guide assembly 54 moves between a raised position (arrow 54A, shown in FIG. 3) and a lowered position. In the raised position, the film guide assembly 54 guides the film transparency T advanced to the operation station 18 by the film infeed assembly 16. In the lowered position, the film guide assembly 54 is lowered so that the film guide assembly 54 is out of alignment with the film plane to allow the film pusher 26 to advance to insert the cut and punched film transparency T into a slide mount M at the insertion station 24.

The film guide assembly 54 moves to the lowered position (arrow 54A) when the operating lever 34 is rotated to the third position. The film guide assembly 54 is lowered via contact of the pivot rod 74 by the operating lever 34 to pivot the knife actuator 302.

(5) DETAILED DESCRIPTION OF FILM TRACK (FIG. 6)

Figure 6:
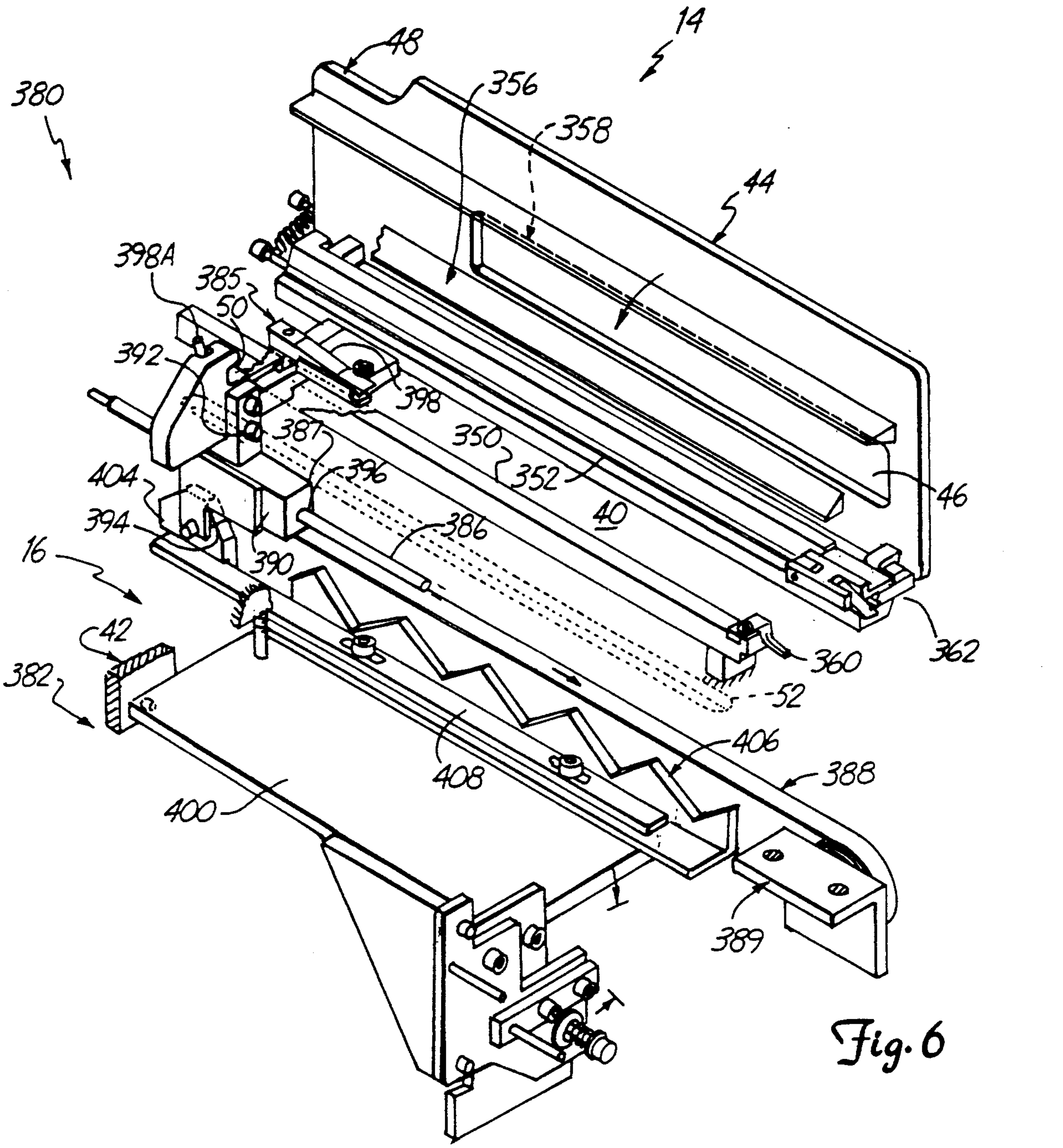
FIG. 6 is an exploded perspective view of the film track and film infeed assembly.

FIG. 6 is an exploded view of the film track 14 and the film infeed assembly 16. In an upper portion of FIG. 6, the film track 14 is shown. The film track 14 includes first and second stepped film edge guides 350 and 352, first and second elongated caps 356 and 358 and end caps 360 and 362. The first and second caps 350 and 352 are mounted to the top plate 40 along the support axis. The film edge guides 350 and 352 are mounted some distance apart to support the lateral edges of the photographic film web W. The hinged cover plate 44 is pivotally mounted to the first film support 350 to pivot between the opened position (as shown FIG. 6) and the closed position (FIG. 2) for supporting the film. The elongated caps 356 and 358 are supported by the cover plate 44 some distance apart so that when the cover plate 44 is in the closed position, the caps 356 and 358 cooperate with the first and second film edge guides 350 and 352 to guide the film for operation.

(6) DESCRIPTION OF FILM INFEED ASSEMBLY (FIGS. 6 & 7)

Figure 7:
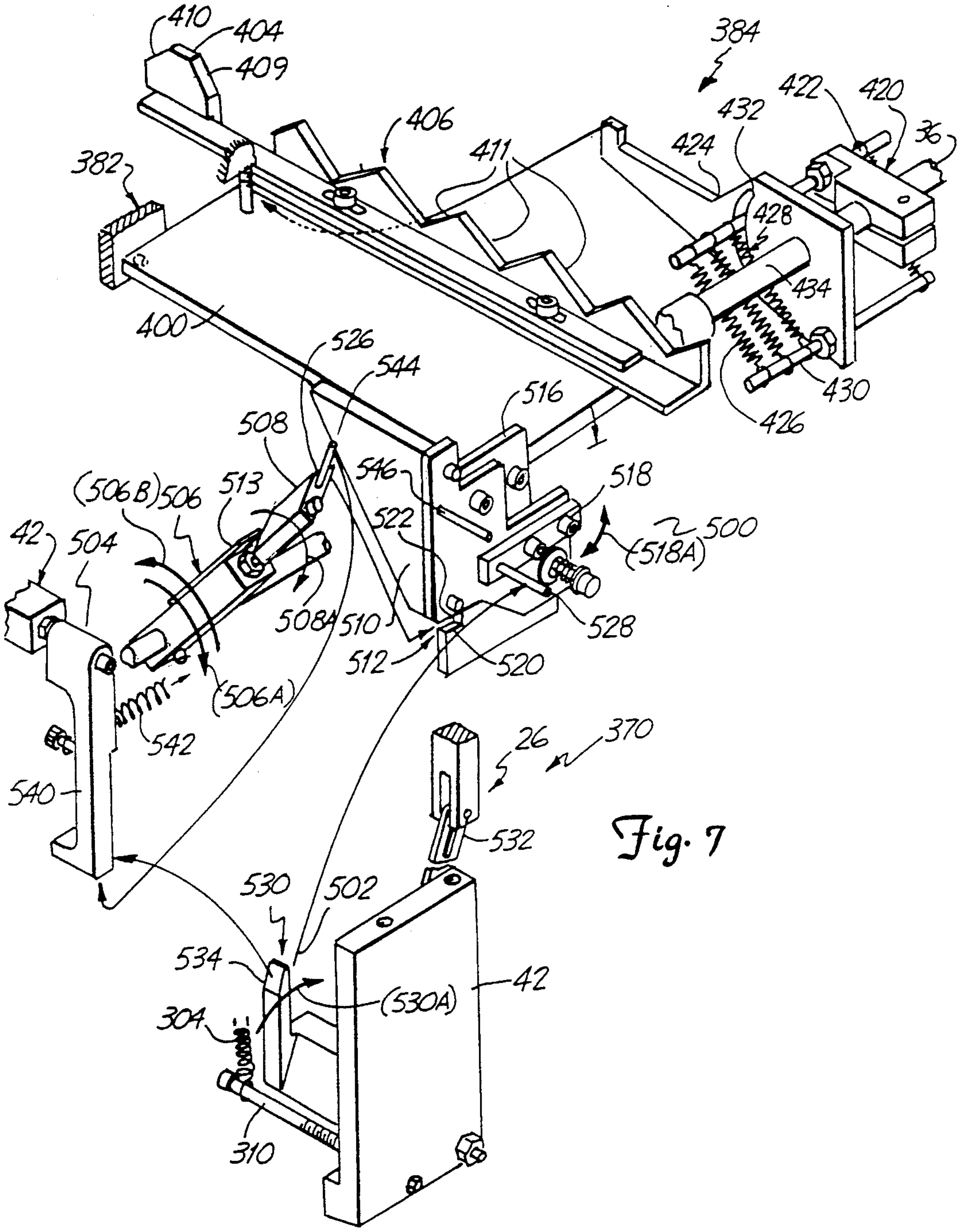
FIG. 7 is an exploded perspective view of a film infeed control assembly and a pusher interlock mechanism.

FIG. 7 is an exploded view of some of the mechanisms of the film infeed assembly 16 and a pusher interlock mechanism 370. As shown in FIGS. 6 and 7, the film infeed assembly 16 includes a film infeed pusher assembly 380 and a film infeed control assembly which includes a stepped film infeed release assembly 382 and a stepped film infeed release actuator 384.

The film infeed pusher assembly 380 includes a pusher 385 which is normally biased towards the operation station 18 for advancing the film thereto. The stepped film infeed release assembly 382 releases the bias of the pusher 385 during operation of the mounter 10 so that multiple film transparencies T are not advanced prior to completion of mounting of the previous photographic slide.

(6a) DESCRIPTION OF FILM INFEED PUSHER ASSEMBLY (FIG. 6)

As shown in FIG. 6, the film infeed pusher assembly 380 includes infeed pusher support shaft 386, pusher support 387, spring 388 and spring mount 389. The infeed pusher support shaft 386 is mounted relative to frame 42 to define a pusher track. The pusher support 387 is movably supported along the infeed pusher support shaft 386 between a retracted position (FIG. 6) and an advanced position proximate to the operation station 18. The spring mount 389 is mounted to the top plate 40 inside the slide mounter 10. Spring 388 is mounted to the spring mount 389 for operation. The spring mount 389 is mounted proximate to the operation station 18 and the bias spring 388 is connected to the pusher support 387 to normally bias the pusher support 387 towards the operation station 18.

The pusher support 387 includes base 390, pusher mount 392 and roller contact 394. As shown, the base 390 includes a throughbore 396 for movably supporting the pusher support 387 along the infeed pusher support shaft 386. The pusher mount 392 extends from the base 390 and is sized to extend through the slot 52 through the top plate 40. The pusher 385 is mounted to the pusher mount 392 to support the pusher 385 for movement along the film track 14.

The pusher 385 includes tweezers 398, tweezers operator 398A and lock 50. Tweezers 398 is aligned with the film track 14 and engages an edge of the film web W to adjust the position of the photographic film web W along the film track 14. In particular, the tweezers 398 via operation by the tweezers operator 398A is used to adjust the film web W to trim the film web W prior to operation for exacting film cutting and punching.

The roller contact 394 extends from the base 390 and is coupled with the film infeed control assembly (stepped film infeed release assembly 382 and stepped film infeed release actuator 384) to control movement of the pusher support 387 and pusher 385 along the infeed pusher support shaft 386 during operation of the mounter 10.

Accordingly, as described, the spring 388 normally forces the pusher support 387, and accordingly, the pusher 385, towards the operation station 18 to advance the film web W for operation. The stepped film infeed release assembly 382 releases the bias of the pusher 385 so that film web W is not advanced while film transparency T is cut, punched and advanced into a slide mount M at the insertion station 24.

(6b) STEP FILM INFEED RELEASE ASSEMBLY (FIGS. 6 & 7)

As shown in FIGS. 6 & 7, the step film infeed release assembly 382 includes rotatable support 400, detent block 404, stepped contact member 406 and mounting plate 408. As shown, the rotatable support 400 is pivotally mounted relative to the frame 42 and supports the detent block 404 and the stepped contact member 406. The detent block 404 and the stepped contact member 406 are connected to the rotatable support 400 in cooperation with the mounting plate 408.

The detent block 404 locks the film infeed pusher assembly 380 at the retracted position (FIG. 1) prior to operation to align the lock 50 with the back recessed surface 48 of the cover plate 44 to open the cover plate 44 to insert a film web W for operation.

As shown in FIG. 7, the detent block 404 includes lock and release actuating surfaces 409 and 410 to alternately lock and release the film infeed pusher assembly 380 prior to operation for inserting the film web W. The detent block 404 is aligned with the roller contact 394 of the infeed pusher assembly 380 so that the roller contact 394 alternately engages the lock and release actuating surfaces 409 and 410 for operation.

Since the detent block 404 is pivotally supported relative to the frame 42, the detent block 404 moves between an upper position and a lower position. As the infeed pusher assembly 380 is retracted to lock the film infeed pusher assembly 380, the roller contact 394 engages the lock actuating surface 409 to move the detent block 404 to the lower position so that the infeed pusher assembly 380 can advance past the detent block 404. After the roller contact 394 is advanced past the detent block 404, the detent block moves to the upper position to lock the infeed pusher assembly 380.

To actuate the film infeed pusher assembly 380 (after the film is loaded), the infeed pusher assembly 380 is manually moved past the release actuating surface 410 to lower the detent block 404 so that the infeed pusher assembly 380 can advanced past the detent block 404 to contact a trailing edge of the film web W.

The stepped contact member 406 is an elongated member having a saw-tooth shaped to define a plurality of recessed stop grooves 411. The alignment of the recessed stop grooves 411 corresponds to the length of a film transparency T. The recessed stop grooves 411 of the stepped contact member 406 are aligned with the roller contact 394 of the infeed pusher assembly 380.

The stepped contact member 406 is movable supported by rotatable support 400 to operate between a engaged position and a non-engaged position. In the engaged position, the recessed stop grooves 411 of the stepped contact member 406 move towards the roller contact 394 to engage the roller contact 394 to release the spring bias of the film infeed pusher assembly 380. In the non-engaged position, the rotatable support 400 moves the stepped contact member 406 away from the contact roller 394 so that film infeed pusher assembly 380 is forced towards the operation station 18 under action of spring 388 to advance the film web W. The rotatable support 400 is normally biased so that the stepped contact member 406 does not contact the roller contact 394 so that the film is normally biased towards the operation station 18.

(6c) STEP FILM RELEASE ACTUATOR (FIG. 7)

As shown in FIG. 7, the step contact member 406 of the stepped film infeed release 382 is operated between the engaged position and the non-engaged position by the stepped film release infeed actuator 382. The stepped film infeed release actuator 384 includes crank arm 420, actuator pin 422, lift arm 424, springs 426 and fixed pins 430. The crank arm 420 is connected to the drive rod 36 and operated thereby.

The lift arm 424 includes a lift motion slot 428 and is aligned with the rotatable support 400 to alternately move the rotatable support 400 to operate the stepped contact member 406 between the engaged position and the non-engaged position. The actuator pin 422 is connected to the crank arm 420 and extends through the motion slot 428 of the lift arm 424 to actuate the lift arm 424 in cooperation with the crank arm 420. Springs 426 are connected to the actuator pin 420 and the fixed pin 430.

The motion slot 428 has an actuating end 432 and a non-actuating end 434 (not visible in FIG. 7). When the actuator pin 422 is moved to the actuating end 432 of the motion slot 428, the lift arm 424 is raised to engage the rotatable support 400 to move the stepped contact member 406 to the engaged position to release the bias of the film infeed pusher assembly 380.

When the actuator pin 422 is at the non-actuating end 434, the lift arm 424 is lowered and does not engage the support 400 to move the stepped contact member 406 to the engaged position. At the non-actuating end 434, the stepped film infeed release assembly 382 does not release the film infeed pusher assembly 380 against the spring bias so the pusher 385 advances the film web W.

The actuator pin 422 is normally biased by springs 426 toward the non-actuating end 434 of the motion slot 428 to advance the film web W. As the operating lever 34 is rotated, the crank arm 420 rotates to move the actuator pin 422 towards the actuating end 432 of the motion slot 428. When the actuator pin 422 contacts the actuating end 432, the lift arm 424 moves the stepped contact member 406 to the engaged position to release the forward bias of film infeed pusher assembly 380. Accordingly, once operation begins, and a leading film transparency T is at the operation station 18, the stepped film infeed release assembly 382 arrests the normally biased infeed pusher assembly 380 so that no film transparencies T are advanced to interfere with operation at the operation station 18.

(7) DESCRIPTION OF PUSHER INTERLOCK MECHANISM (FIGS. 7 AND 8A-8C)

Figure 8A:
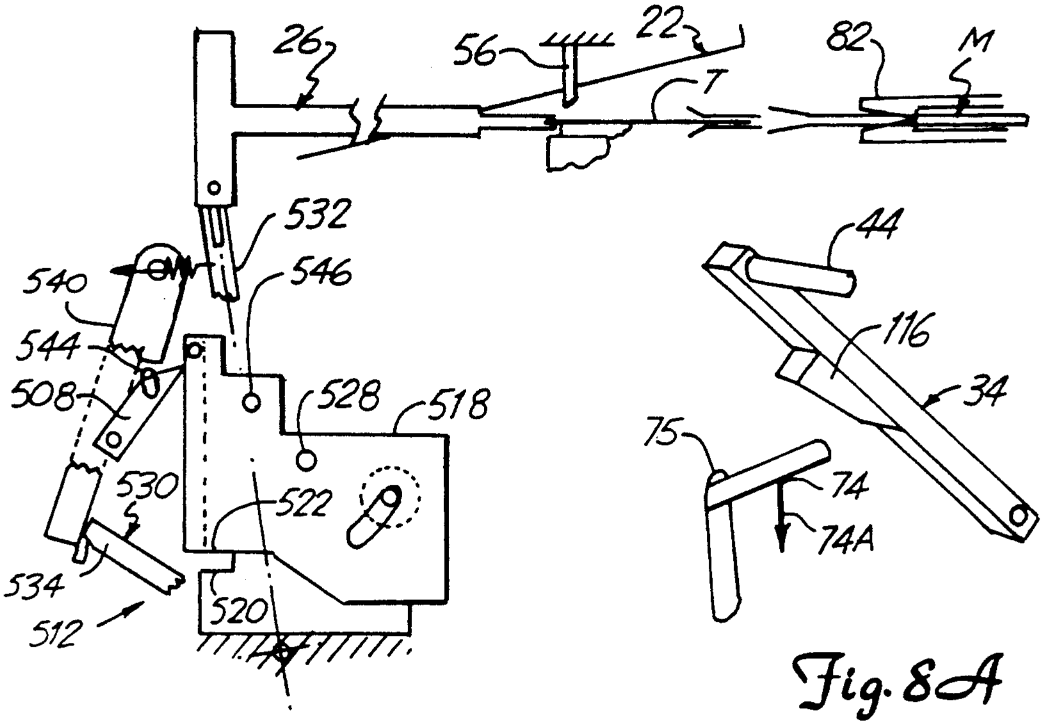
FIGS. 8A-8C are sequential plan views illustrating operation of the pusher interlock mechanism.
Figure 8B:
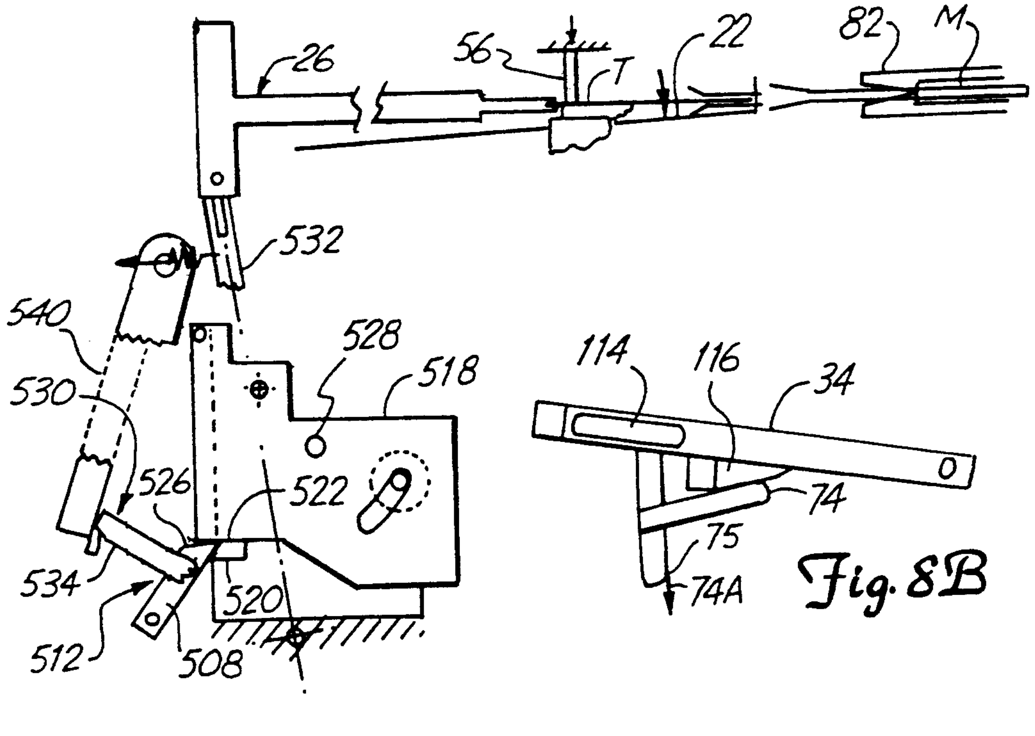
Figure 8C:
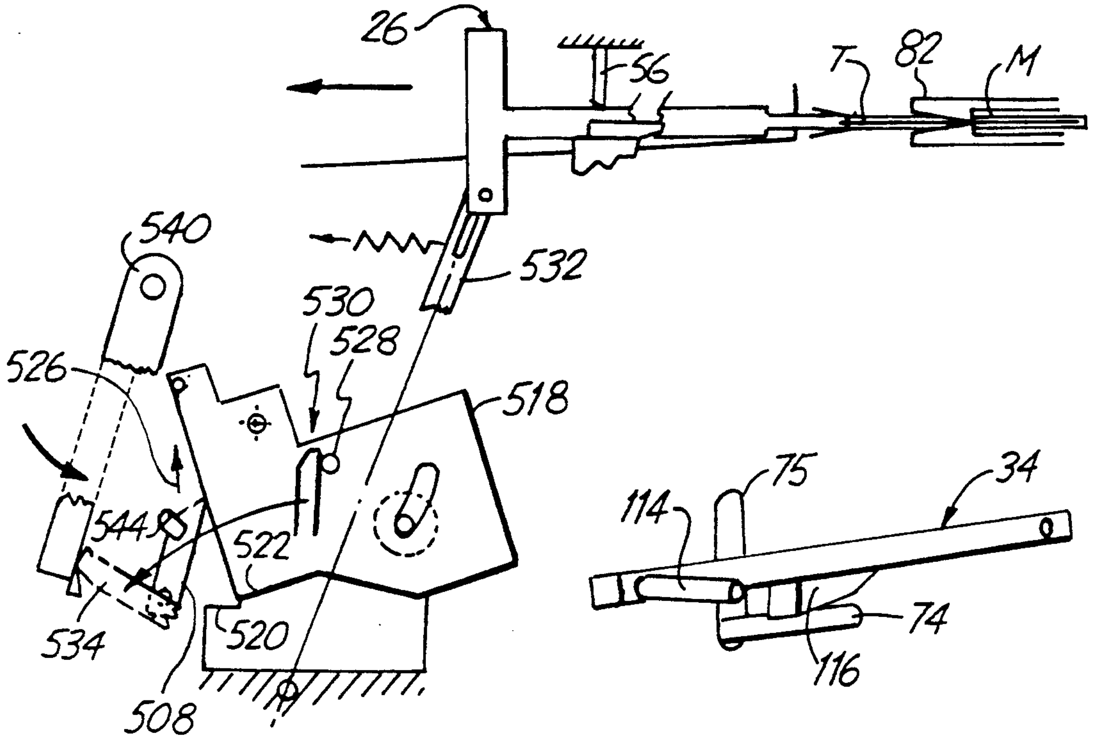

FIGS. 8A-8C illustrate operation of the pusher interlock mechanism 370. As shown in FIG. 7, the pusher interlock mechanism 370 includes a lock assembly 500, lock release 502 and full release catch 504. The lock assembly 500 locks release of the operating lever 34 after operation of the punch mechanism 20 and the knife assembly 22 to assure that the film pusher 26 is advanced to insert the cut and punched film transparency T into the slide mount M. The lock release 502 releases the lock assembly 500 after operation of the film pusher 26 to permit release of the operating lever 34 for the next operation cycle. The full release catch 504 assures that the film pusher 26 is fully retracted prior to release of the operating lever 34.

The lock assembly 500 includes crank arm 506, pivot lock 508, bias contact ramp 510, lock catch 512 and stop arm 513. The pivot lock 508 is pivotally mounted to the crank arm 506 and movable (arrow 508A) between a locked position (FIG. 8B) and an unlocked position (FIGS. 8A and 8C) under the action of gravity by operation of the operating lever 34. In the locked position, release of the operating lever 34 is locked until the film pusher assembly 26 operates. The stop arm 513 is also mounted to the crank arm 506. The pivot lock 508 includes a sloped contact surface 526.

The bias contact ramp 510 is aligned with the pivot lock 508 so that the pivot lock 508 is initially held by the bias contact ramp 510 in the unlocked position. The contact ramp 510 maintains the pivot lock 508 in the unlocked position until operation of the mounter 10. As illustrated in FIGS. 8A and 8C during operation, the drive rod 36 rotates the crank arm 506 (arrow 506A) to move the pivot lock 508 along the contact ramp 510 to the locked position. The lock catch 512 is aligned with the pivot lock 508 in the locked position. At the locked position, the pivot lock 508 is no longer supported against contact ramp 510 and pivots (arrow 508A) to drop into the lock catch 512.

The lock catch 512 is defined by fixed mounting plate 516 and movable lock plate 518. The fixed mounting plate 516 and movable lock plate 518 include cooperating notches 520 and 522 to form the lock catch 512.

The movable lock plate 518 is coupled to the bias contact ramp 510 and moves (arrow 518A) to alternately position the notch 522 to form the lock catch 512. As shown in FIGS. 8A and 8B, the notch 522 forms the lock catch 512 and in FIG. 8C, the lock plate 518 shifts to release the lock catch 512. The stop arm 513 restricts movement (506B) of the pivot lock 508 to bias the pivot lock 508 towards the contact ramp 510 to maintain the position of the contact ramp 510 for operation of the lock catch 512.

Prior to operation, the contact ramp 510 are holds pivot lock 508 in the unlocked position. The sloped contact surface 526 of the pivot lock 598 to seat into the lock catch 512. During operation of the operating lever 34, the crank arm 506 advances the pivot lock 508 along the contact ramp 510 At the end of the contact ramp 510, the pivot lock 508 pivots (Arrow 508A) since it is no longer supported by the contact ramp 510 at lock catch 512. Thus, the notch 522 interferes with the pivot lock 508 to restrict release of the operating lever 34 by restricting rotation of the crank arm 506 in the direction indicated by arrow 506B in FIG. 7.

As explained, the lock release 504 is coupled with operation of the film pusher 26. The lock release 502 releases the pivot lock 508 from the lock catch 512 after operation of the film pusher 26. In particular, the lock release 502 moves the lock plate 518 to shift notch 522 to release the lock catch 512 to permit release of the operating lever 34 for the next operating cycle.

The lock release 502 includes lock release pin 528, lock release actuator 530 and link 532. The lock release pin 528 is supported by the lock plate 518 and extends therefrom. The lock release actuator 530 includes contact member 534 and is coupled with the operation of the film pusher 26. The lock release actuator 530 is aligned to contact the lock release pin 528 to move the lock plate 518 as shown in FIG. 8C to shift notch 522 to release the lock catch 512 to permit release of the pivot lock 508 and thereby the operating lever 34 after operation of the film pusher 26.

The link 532 connects the film pusher 26 to the lock release actuator 530. Operation of the pusher 26 thus pivots (Arrow 530A, FIG. 7) the lock release actuator 530 between a first position (FIGS. 7, 8A and 8B) and a second contact position (FIG. 8C). In the first position (FIG. 7, 8A and 8B) the lock release actuator 530 does not contact the lock release pin 528 to release the lock catch 512. In the second position, the lock release actuator 530 contacts the lock release pin 528 to release the lock catch 512.

A spring (not shown) biases the lock release actuator 530 in the first position and thereby via link 532 biases the film pusher 26 in the retracted position. When the film pusher 26 is advanced to the insertion station 24, the lock release actuator 530 moves, via the link 532 to the second contact position (FIG. 8C) to release the pivot lock 508 after operation of the film pusher 26.

As previously explained, the interlock mechanism 370 also includes full release catch 504. As shown in FIG. 7, the full release catch 504 includes pivotally supported interference block 540, spring 542, catch pin 544, and interference block stop 546. The interference block 540 is pivotally mounted at one end relative to the frame 42 and is designed to move between a retracted position and an interference position. The catch pin 544 is mounted to the pivot lock 508. In the interference position, the block 540 is aligned with the catch pin 544 of the pivot lock 508 so that the catch pin 544 engages the block 540 to restrict complete release of the pivot lock 508 for operation of the operating lever 34.

In the interference position, the block 540 is supported by the interference block stop 546 mounted to the lock plate 518. The spring 542 normally biases the interference block 540 towards the interference block stop 546 (i.e. interference position). A free end of the interference block 540 is aligned with the contact member 534 of the lock release actuator 530. The contact member 534 of the lock release actuator 530 engages the free end of the interference block 540 when the lock release actuator 530 is in the first position prior to operation of the film pusher 26. Accordingly prior to operation of the film pusher 26, the lock pin release actuator 530 normally forces the interference block 540 away from interference position. When the film pusher 26 advances the lock release actuator 530 moves from the first position to the second position to release the interference block 540. The interference block 540 moves to the interference position under action of spring 542 to rest at the interference block stop 546.

The interference block 540 remains in the interference position until the lock release actuator 530 returns to the first position after the film pusher 26 returns to the retracted position. When the lock release actuator 530 returns to the first position upon completion of operation of the film pusher 26, the contact member 534 of the lock release actuator 530 contacts the free end of the interference block 540 to move the interference block 540 against the spring 542 from the interference position. Thus, operation of the interference block 540 assures that the film pusher 26 is completely retracted so that the pusher 90 is clear of the operation station 18 for the next operation cycle.

(9) DESCRIPTION OF SLIDE EJECTOR MECHANISM (FIG. 9)

Figure 9:
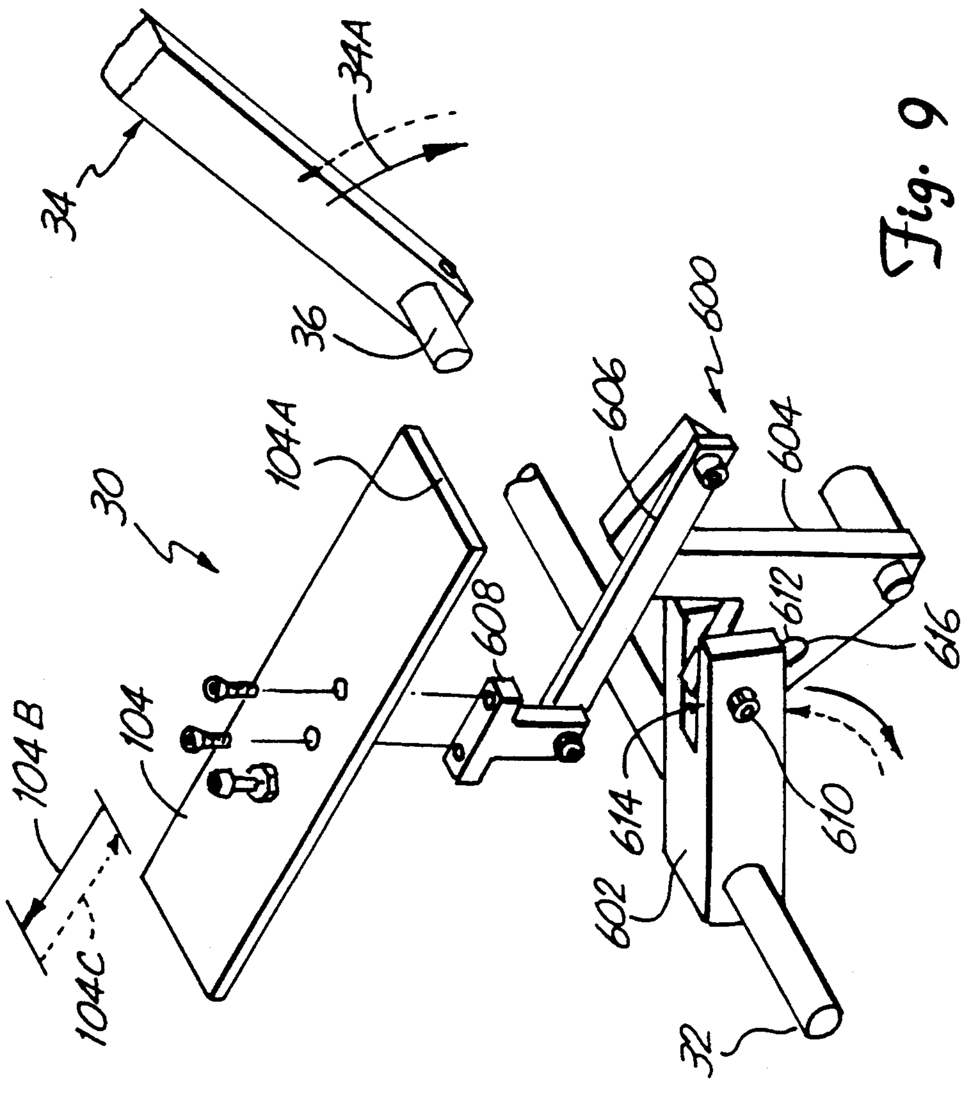
FIG. 9 is exploded perspective view of a slide ejector and ejector operating assembly.

FIG. 9 illustrates operation of the slide ejector mechanism 30. Operation of the slide ejector mechanism 30 is coupled to the operating lever 34 to eject a slide mount M to the insertion station 24. The slide ejector mechanism 30 is operated by the operating lever 34 via an ejector linkage assembly 600.

The ejector linkage assembly 600 includes crank arm 602, actuator 604, ejector drive arm 606, ejector mount 608 and connection pin 610. The crank arm 602 is connected to the drive rod 36 to operate the actuator 604. The actuator 604 moves the ejector drive arm 606 which is coupled to the ejector 104 via the ejector mount 608 to operate the ejector mechanism 30.

The actuator 604 includes a motion slot 612 having a forward end 614 (not visible in FIG. 9) and a retracted end 616. The connection pin 610 extends through the motion slot 612 to connect the crank arm 602 to the actuator 604. Movement of the crank arm 602 by the operating lever 34 moves the connection pin 610 between the forward end 614 and the retracted end 616 of the motion slot 612.

Prior to operation of the slide mounter 10, the slide ejector 104 is positioned within the slide magazine 28 so that a forward end 104A of the slide ejector 104 is aligned with the insertion station 24. The connection pin 610 is positioned at the forward end 614 of the motion slot 612. During operation, the operating lever 34 is rotated to rotate the crank arm 602 which moves the connection pin 610 to the retracted end 616 of the motion slot 612.

Further rotation of the crank arm 602 (after the connection pin 616 contacts the retracted end 616) retracts the ejector drive arm 606 away from the insertion station 24 to retract the slide ejector 104 (Arrow 104B). When the operating lever 34 is released after an operation cycle, the crank arm 602 rotates to move the connection pin 610 toward the forward end 614 of the motion slot 612 to advance the ejector drive arm 606 to advance the slide ejector 104 (Arrow 104C) to eject a slide mount M through the ejector opening 102 of the slide magazine 28 into the insertion station 24.

(10) CONCLUSION

During operation, the operating lever 34 rotates between the first position, the second position and the third position to operate the punch mechanism 20 and the knife assembly 22. The punch mechanism 20 punches punch holes P in the film transparency T at the operation station 18 and the knife assembly 22 severs the film transparency T from the film W. While the operating lever 34 is in the third position, the film pusher 26 is manually operated to advance the cut and punched film transparency T from the operation station 18 into the slide mount M at the insertion station 24. The operating lever 34 is locked at the third position by the pusher interlock mechanism 370 to assure that the cut and punched film transparency T is inserted into the slide mount M.

The operating lever 34 is locked until the film pusher 26 is fully retracted and is out of the operation station 18 so that the film pusher 26 does not interfere with advancement of the film web W by the film infeed assembly 16. The full release catch 504 assures that the film pusher 26 is fully retracted prior to releasing the operating lever 34 for a new operation cycle. As the operating lever 34 is released from the third position, the slide ejector mechanism 30 ejects a new empty slide mount M to be filled.

Prior to operation, the film infeed assembly 16 normally biases the infeed pusher 90 to advanced the photographic film web W so that a film transparency T is at the operation station 18. During operation of the slide mounter 10 by the operating lever 34, the stepped film infeed release assembly 382 is actuated so that the stepped contact member 406 engages the film pusher 26 to release the forward bias. Accordingly, while the film transparency T is being punched and cut at the operation station 18, no film is advanced to the operation station 18 until the cut and punched film transparency T is inserted into the slide mount M so that the slide mounter 10 does not jam.

Although the present invention has been described with reference to preferred embodiments, workers skilled in the art will recognize that changes may be made in form and detail without departing from the spirit and scope of the invention.

What is claimed is:

1. A slide mounting apparatus for preparing photographic slides for film transparencies where film transparencies are cut from a photographic film web and inserted into a slide mount during an operation cycle of the slide mounting apparatus, the slide mounting apparatus comprising:

a frame;

a slide magazine for holding a plurality of slide mounts for operation;

a slide ejector mechanism for ejecting a slide mount from the slide magazine to an insertion station to receive a film transparency;

a film track for supporting the photographic film web during operation;

means for advancing the film transparencies to an operation station;

a punch mechanism including punch pins, the punch mechanism operating between a retracted position and a punch position, in the punch position, the punch pins piercing the film transparency to form punch holes;

means for supporting the punch mechanism to operate between the retracted position and the punch position;

means for alternating the punch mechanism between the retracted position and the punch position; and means for supporting a leading film transparency at the operation station while the punch mechanism is in the punch position and the punch pins pierce through the film transparency;

a knife assembly for cutting the film transparency from the film web;

means for inserting the cut and punched film transparency into the slide mount at the insertion station; and a punch clamp for securing the film transparency at the operation station while the punch mechanism operates, the punch clamp including:

a clamp for engaging the film transparency at the operation station;

means for supporting the clamp between a retracted position and a clamped position; and means for alternating the clamp between the retracted position and the clamped position during operation of the punch mechanism to secure the film transparency.

2. An apparatus for processing a length of a photographic film web having ak plurality of images transverse to the length of the film web, for mounting an individual film section within a slide mount, the apparatus comprising:

a frame;

a slide magazine connected to the frame for holding a plurality of slide mounts;

means for locating a slide mount from the slide magazine into a film loading station so as to prepare the slide mount to receive the individual film section;

a film processing station adjacent the film loading station, the film processing station including a clamp for engaging the photographic film web, a punch connected to the clamp for punching a first hole in the photographic film web along a first edge of the photographic film web, and means for biasing the first edge of the photographic film web against the punch;

means aligned with the film processing station for directing an end of the photographic film web into the film processing station;

cutting means adjacent to the film processing station for severing the individual film section from the photographic film web; and means aligned with the film processing station and the film loading station for directing the individual film section into the slide mount.

3. The slide mounting apparatus of claim 1 wherein the means for supporting the film transparency at the operation station for operation of the punch mechanism includes:

a punch anvil supported relative to the frame, the punch anvil including punch holes sized to receive the punch pins therein.

4. A slide mounting apparatus for preparing photographic slides for film transparencies where film transparencies are cut from a photographic film web and inserted into a slide mount during an operation cycle of the slide mounting apparatus, the slide mounting apparatus comprising:

a frame;

a slide magazine for holding a plurality of slide mounts for operation;

a slide ejector mechanism for ejecting a slide mount from the slide magazine to an insertion station to receive a film transparency;

a film track for supporting the photographic film web;

a film infeed pusher assembly including:

a pusher for engaging the film web for advancement;

a pusher track mounted relative to the frame;

a pusher support slidably mounted relative to the pusher track to move between a retracted position and an advanced position adjacent to the operation station, the pusher being mounted to the pusher support and moveable therewith for advancing film transparencies to the operation station;

means for forwardly biasing the film infeed pusher assembly to the advanced position; and means for alternately releasing the forward bias of the film infeed pusher assembly during operation;

a knife assembly for cutting the film transparency from the film web at the operation station; and means for advancing the cut film transparency from the operation station to the insertion station to insert the cut film transparency into the slide mount at the insertion station.

5. A slide mounting apparatus for preparing photographic slides for film transparencies where film transparencies are cut from a photographic film web and inserted into a slide mount during an operation cycle of the slide mounting apparatus, the slide mounting apparatus comprising:

a frame;

a slide magazine for holding a plurality of slide mounts for operation;

a slide ejector mechanism for ejecting a slide mount from the slide magazine to an insertion station to receive a film transparency;

a film track for supporting the photographic film web during operation;

means for advancing the film transparencies to an operation station;

a punch mechanism including punch pins, the punch mechanism operating between a retracted position and a punch position, in the punch position, the punch pins piercing the film transparency to form punch holes;

means for supporting the punch mechanism to operate between the retracted position and the punch position;

means for alternating the punch mechanism between the retracted position and the punch position;

means for supporting a leading film transparency at the operation station while the punch mechanism is in the punch position and the punch pins pierce through the film transparency;

a knife assembly for cutting the film transparency from the film web;

means for inserting the cut and punched film transparency into the slide mount at the insertion station; and a film guide assembly including;

a film guide;

means for pivotally supporting the film guide at the operation station for movement between a back position and a forward position, in the forward position, the film guide engages the film transparency at the operation station to move the film transparency for exacting placement of the film transparency; and means for alternating the film guide between the back position and the forward position for exacting placement of the film transparency prior to operation at the operation station.

6. The slide mounting apparatus of claim 5 wherein the film guide includes a beveled operating face and the means for alternating the film guide between the back position and the forward position comprises:

means for alternating engaging and disengaging for operating the beveled operating face of the film guide between the back position and the forward position.

7. A slide mounting apparatus for preparing photographic slides for film transparencies where film transparencies are cut from a photographic film web and inserted into a slide mount during an operation cycle of the slide mounting apparatus, the slide mounting apparatus comprising:

a frame;

a slide magazine for holding a plurality of slide mounts for operation;

a slide ejector mechanism for ejecting a slide mount from the slide magazine to an insertion station to receive a film transparency;

a film track for supporting the photographic film web during operation;

means for advancing the film transparencies to an operation station;

means for punching punch holes in the film transparency;

a knife assembly for cutting the film transparency from the film web;

means for inserting the cut and punched film transparency into the slide mount at the insertion station;

a film infeed pusher assembly including:

a pusher for engaging the film web for advancement;

a pusher track mounted relative to the frame; and a pusher support slidably mounted relative to the pusher track to move between a retracted position and an advanced position adjacent to the operation station, the pusher being mounted to the pusher support and movable therewith for advancing film transparencies to the operation station;

means for forwardly biasing the pusher of the film infeed pusher assembly towards the advanced position; and means for alternately releasing the forward bias of the pusher of the film infeed pusher assembly during operation.

8. The slide mounting apparatus of claim 7 wherein the means for forwardly biasing the film infeed pusher assembly is a spring.

9. The slide mounting apparatus of claim 7 wherein the means for alternately releasing the forward bias of the film infeed pusher assembly comprises:

a stepped contact member movably supported between an engaged position and a non-engaged position, the stepped contact member being formed of an elongated member extending along the pusher track, the contact member including a plurality of recessed stop grooves corresponding to the length of a film frame and aligned for engagement of the film infeed pusher assembly therebetween;

means for moving the contact member between the engaged position and the non-engaged position for engagement of film infeed pusher assembly between the recessed stop grooves to release the forward bias.

10. The slide mounting apparatus of claim 9 wherein the means for moving the contact member between the engaged position and the non-engaged position comprises:

an actuator member movably supported to alternately engage and disengage the stepped contact member; and means for moving the actuator member to alternately engage and disengage the stepped contact member, the means for moving the actuator member being coupled with an operating level to move the actuator to engage the stepped contact member to release the bias of the infeed pusher assembly during operation.

11. The slide mounting apparatus of claim 7 wherein the operation station and the insertion station are aligned along an operation axis and the film track is aligned along a support axis, the support axis being perpendicular to the operation axis.

12. The slide mounting apparatus of claim 7 wherein the means for inserting a film transparency into the slide mount at the insertion station comprises:

a pusher movably supported between a retracted position and an insertion position for inserting the film transparency;

a pusher track for movably supporting the pusher to move between the retracted position and the insertion position; and means for operating the pusher along the pusher track between the retracted position and the insertion position.

13. The slide mounting apparatus of claim 12 wherein the pusher includes a handle for manually operating the pusher along the pusher track between the retracted position and the insertion position.

14. The slide mounting apparatus of claim 10 wherein the operating lever is rotatably supported relative to the frame, the operating lever being rotated for operation and released thereafter for the next operation cycle, the apparatus further including an interlock mechanism for locking release of the operating lever prior to operation of the means for inserting the film transparency, the interlock mechanism comprising:

a lock mechanism designed to alternate between a locked position and an unlocked position, in the locked position, the lock mechanism restricting release of the operating lever and in the unlocked position, the operating lever being release for a next operation cycle, the lock mechanism being coupled to the operating lever to alternate between the unlocked position and the locked position upon operation of the operating lever; and a lock release mechanism coupled with the pusher for shifting the lock mechanism from the locked position to the unlocked position after operation of the pusher.

15. The slide mounting apparatus of claim 14 and further including:

a full release catch mechanism coupled with the pusher and the operating lever to restrict release of the operating lever until the pusher is in the retracted position.

16. A slide mounting apparatus for preparing photographic slides for film transparencies where film transparencies are cut from a photographic film web and inserted into a slide mount during an operation cycle of the slide mounting apparatus, the slide mounting apparatus comprising:

a frame;

a slide magazine for holding a plurality of slide mounts for operation;

a slide ejector mechanism for ejecting a slide mount from the slide magazine to an insertion station to receive a film transparency;

a film track for supporting the photographic film web during operation;

means for advancing the film transparencies to an operation station;

means for punching punch holes in the film transparency;

a knife assembly for cutting the film transparency from the film web;

means for inserting the cut and punched film transparency into the slide mount at the insertion station;

an operating lever rotatably mounted relative to the frame to operate between a first position, a second position and a third position, the operating lever being normally biased in the first position and moveable to the third position by an operator for operation of a cycle of the apparatus;

coupling means for alternating the punch mechanism between the retracted position and the punch position when the operating lever is moved from the first position to the second position;

a knife actuator rod coupled with the knife assembly and in alignment with the operating lever so that the operating lever contacts the knife actuator rod to operate the knife assembly between an opened position and a closed cutting position, the operating lever contacting the knife actuator rod at the second position; and coupling means for operating the slide ejector mechanism for ejecting a slide mount from the slide magazine to the insertion station as the operating lever is released.

17. The slide mounting apparatus of claim 4 wherein the means for alternately releasing the forward bias of the film infeed pusher assembly comprises:

a stepped contact member moveably supported between an engaged position and a non engaged position, the stepped contact member being formed of an elongated member extending along the pusher track, the contact member including a plurality of recessed stop grooves corresponding to the length of a film frame and aligned for engagement of the film infeed pusher assembly therebetween;

means for moving the contact member between the engaged position and the non engaged position for engagement of the film infeed pusher assembly between the recessed stop grooves to release the forward bias.

* * * * *

UNITED STATES PATENT AND TRADEMARK OFFICE

CERTIFICATE OF CORRECTION

PATENT NO. : 5,276,954

DATED : January 11, 1994

INVENTOR(S) : WILBUR GERRANS, JAMES A. TRUC, EDWIN D. JANSEN

It is certified that error appears in the above-identified patent and that said Letters Patent is hereby corrected as shown below:

Col. 16, line 42, delete "ak", insert --a--

Signed and Sealed this

Twenty-first Day of June, 1994

Attest:

BRUCE LEHMAN

Attesting Officer

Commissioner of Patents and Trademarks